United States Patent
Nehme Antoun et al.

(10) Patent No.: US 9,144,049 B1
(45) Date of Patent: *Sep. 22, 2015

(54) METHODS AND SYSTEMS FOR USING MACRO COVERAGE TO MANAGE FEMTOCELL REGISTRATIONS, SO AS TO AVOID SIGNALING OVERLOAD

(71) Applicant: Sprint Spectrum L.P., Overland Park, KS (US)

(72) Inventors: Nicolas A. Nehme Antoun, Olathe, KS (US); Ryan S. Talley, Overland Park, KS (US); Kyle C. Allen, Overland Park, KS (US); Khalid Medhat, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,793

(22) Filed: Feb. 28, 2015

Related U.S. Application Data (63) Continuation of application No. 14/013,991, filed on Aug. 29, 2013.

(51) Int. Cl.
*H04W 4/00* (2009.01)
*H04W 60/00* (2009.01)

(52) U.S. Cl.
CPC .................................... *H04W 60/00* (2013.01)

(58) Field of Classification Search
CPC ................... H04W 4/02; H04W 60/00–60/06; H04W 484/045
USPC ...................... 455/435.1; 726/27, 3
See application file for complete search history.

(56) References Cited

U.S. PATENT DOCUMENTS 5,655,219 A * 8/1997 Jusa et al. ..................... 455/338
6,411,816 B1 * 6/2002 McDonald et al. ........... 455/518

(Continued)

FOREIGN PATENT DOCUMENTS

| EP | 2360959 A1 | 8/2011 |
| EP | 2432284 A1 | 3/2012 |
| EP | 2584843 A1 | 4/2013 |

OTHER PUBLICATIONS

U.S. Appl. No. 14/013,991, filed Aug. 29, 2013, inventors Nicolas A. Nehme Antoun, Ryan S. Talley, Kyle C. Allen, and Khalid M. Medhat.

(Continued)

*Primary Examiner* — Charles Shedrick (57) ABSTRACT

Methods and systems for using coverage or capacity classifications regarding a macro RF network to manage registration of femtocells with a service provider network (SPN) so as to avoid signaling overload are described herein. After a wide-scale power outage within an area where multiple femtocells are located, the femtocells can power on and attempt to register with the SPN at about the same time. The femtocells can scan RF signals received from the macro network and classify the received RF signals with respect to capacity or coverage of the macro network at the time of transmitting the RF signals. A device within the SPN can determine whether classification of the received RF signals is associated with dropping or accepting a registration request associated with the classified RF signals. The SPN device can accept the registration request or drop the registration request and request the femtocell to transmit another registration request.

20 Claims, 6 Drawing Sheets

(56) References Cited

U.S. PATENT DOCUMENTS

| | | | |
|---|---|---|---|
| 7,929,970 B1 | 4/2011 | Gunasekara et al. | |
| 8,266,686 B1 | 9/2012 | Ginnings | |
| 8,335,503 B1 | 12/2012 | Desmond et al. | |
| 8,479,269 B1 | 7/2013 | Malreddy et al. | |
| 8,498,241 B1 | 7/2013 | Talley et al. | |
| 8,504,072 B2* | 8/2013 | Ishii et al. | 455/456.2 |
| 8,626,223 B2* | 1/2014 | Brisebois et al. | 455/522 |
| 8,676,125 B2* | 3/2014 | Nanda et al. | 455/63.1 |
| 8,761,753 B2* | 6/2014 | Meshkati et al. | 455/422.1 |
| 8,989,758 B1 | 3/2015 | Talley et al. | |
| 2001/0049281 A1 | 12/2001 | Duplessis et al. | |
| 2006/0166667 A1* | 7/2006 | Grilli et al. | 455/435.1 |
| 2007/0097939 A1* | 5/2007 | Nylander et al. | 370/338 |
| 2009/0097448 A1* | 4/2009 | Vasudevan et al. | 370/331 |
| 2009/0098871 A1 | 4/2009 | Gogic | |
| 2009/0129336 A1 | 5/2009 | Osborn | |
| 2009/0196253 A1* | 8/2009 | Semper | 370/331 |
| 2009/0215452 A1 | 8/2009 | Balasubramanian et al. | |
| 2009/0247170 A1 | 10/2009 | Balasubramanian et al. | |
| 2010/0035617 A1* | 2/2010 | Whinnett | 455/436 |
| 2010/0048212 A1 | 2/2010 | Yavuz et al. | |
| 2010/0151857 A1* | 6/2010 | Brisebois et al. | 455/434 |
| 2010/0210280 A1 | 8/2010 | Haynes et al. | |
| 2010/0216478 A1 | 8/2010 | Buddhikot et al. | |
| 2010/0273481 A1* | 10/2010 | Meshkati et al. | 455/435.1 |
| 2010/0279686 A1 | 11/2010 | Tokgoz et al. | |
| 2010/0315967 A1 | 12/2010 | Patel et al. | |
| 2010/0329132 A1 | 12/2010 | Raghothaman et al. | |
| 2011/0009065 A1 | 1/2011 | Carter | |
| 2011/0076960 A1* | 3/2011 | Yun et al. | 455/67.14 |
| 2012/0020346 A1 | 1/2012 | Ganapathy | |
| 2012/0046063 A1* | 2/2012 | Chande et al. | 455/522 |
| 2012/0117624 A1* | 5/2012 | Khan et al. | 726/3 |
| 2012/0226812 A1 | 9/2012 | Ren et al. | |
| 2013/0142169 A1* | 6/2013 | Kulakov et al. | 370/331 |
| 2013/0143541 A1* | 6/2013 | Henderson et al. | 455/418 |
| 2013/0150035 A1* | 6/2013 | Chande et al. | 455/435.1 |
| 2013/0288688 A1* | 10/2013 | Xiong et al. | 455/438 |
| 2013/0329638 A1* | 12/2013 | Ren et al. | 370/328 |
| 2014/0045505 A1* | 2/2014 | Henry et al. | 455/444 |

OTHER PUBLICATIONS

U.S. Appl. No. 12/627,758, filed Nov. 30, 2009, inventors Muralidhar Malreddy, Ryan S. Talley, and Rajveen Narendran.

Advisory Action mailed Jul. 3, 2012 for U.S. Appl. No. 12/400,905, 9 pages.

Notice of Allowance mailed Mar. 21, 2013 for U.S. Appl. No. 12/400,905, 11 pages.

Final Office Action mailed Apr. 11, 2012 for U.S. Appl. No. 12/400,905, 26 pages.

Non-Final Office Action mailed Sep. 28, 2011 for U.S. Appl. No. 12/400,905, 25 pages.

Non-Final Office Action mailed Oct. 3, 2012 for U.S. Appl. No. 12/400,905, 27 pages.

Notice of Allowance mailed Jun. 13, 2012 for U.S. Appl. No. 12/627,758, 9 pages.

Sinnreich, Henry; et al; SIP Beyond VoIP; Table of contents, 2-4, 17-21, 34-35, 39-40 and 173-187 (37 pages); Jul. 2005.

Tecore, Inc.; Tecore networks scalable 2G-3G-4G Networks; CTIA Wireless 2010; downloaded from the World Wide Web at http://www.tecore.com/newsevents/ctia.cfm on Aug. 14, 2013; 3 pages.

Airvavna; Femtocell Network Architecture; downloaded from the World Wide Web at http://www.airvana.com/technology/femtocell-network-architecture/?printerFriendly on Aug. 14, 2013; 10 pages.

Cisco Systems Inc.; Cisco As5350XM Universal Gateway; Apr. 2011; 22 pages.

Wireless Week; Femtocells: Securing the Core-Internet border; Nov. 21, 2008, 9 pages.

Microsoft; SIP Trunking Technology, Communications Server 2007 R2, Jan. 21, 2009; 3 pages.

Metaswitch Networks; What is an SBC? What is a Session Border Controller? downloaded from the World Wide Web at http://network-technologies.metaswitch.com/sbc-session-border-controller/what-is-sbc.aspx on Aug. 14, 2013, 3 pages.

U.S. Appl. No. 13/829,743, filed Mar. 14, 2013, inventors: Talley, Ryan, S.; Malreddy, Muralidhar Srinivas, Shilpa Kowdley; and Allen, Kyle C.

* cited by examiner

METHODS AND SYSTEMS FOR USING MACRO COVERAGE TO MANAGE FEMTOCELL REGISTRATIONS, SO AS TO AVOID SIGNALING OVERLOAD

RELATED APPLICATION

This application is a continuation of prior U.S. patent application Ser. No. 14/013,991, filed Aug. 29, 2013. U.S. Patent Application No. 14/013,991 issued on May 5, 2015 as U.S. Pat. No. 9,026,110. U.S. patent application Ser. No. 14/013,991 is incorporated herein by reference.

BACKGROUND

A wireless communication device, such as a cellular phone or a tablet device, can be used to perform various types of communications, such as making voice calls, transmitting or receiving textual messages, and transmitting or receiving computer-readable files. The various types of communications can be carried out by one or more communication networks. One of the communication networks can be a wireless network operated by a service provider that provides communication services to a user of the wireless communication device.

A service provider network can be configured in an arrangement that requires the wireless devices to register with the service provider network prior to the device using the service provider network. The service provider network can be overloaded if a large number of devices, such as wireless communication devices, request registration with the network simultaneously or close to simultaneously and the service provider network attempts to process all of the registrations requests. A quality of service provided by the service provider network can be degraded when the service provider network is overloaded by processing a high quantity of registration requests.

Unless otherwise indicated herein, the elements described in this section are not prior art to the claims and are not admitted to be prior art by inclusion in this section.

Overview

This application describes several example embodiments, at least some of which pertain to accepting or dropping registration requests at a service provider network connected to a femtocell base station that can provide one or more wireless communication devices with connectivity to the service provider network. Any or one or more of the example embodiments can also pertain to classifying macro radio frequency (RF) signals received at the femtocell base station, transmitting a registration request with data classifying the RF signals with respect to coverage and capacity of a macro base station, receiving the registration request from the femtocell base station, or determining whether to drop or accept a registration request based on the classification data or an activity level experienced by the femtocell base station.

In one respect, an example embodiment can take the form of a method comprising: (i) receiving, at a core network device of a core network, a registration request from a femto base station, wherein the registration request includes a classification of radio frequency (RF) signals from a macro base station connected to the core network, (ii) determining, by the core network device, whether the classification of the RF signals from the macro base station is associated with dropping or accepting the registration request, (iii) dropping, by the core network device, the registration request if the classification of the RF signals is associated with dropping the registration request, and (iv) accepting, by the core network device, the registration request if the classification of the RF signals is associated with accepting the registration request. In accordance with at least some embodiments, the core network device can determine an activity level of the femto base station. In accordance with those embodiments, dropping the registration request can be conditioned on the activity level of the femto base station being less than an activity level threshold and accepting the registration request can be conditioned on the registration request being greater than the activity level threshold.

In another respect, an example embodiment can take the form of a system comprising (i) a network interface configured to receive a registration request from a femto base station, wherein the registration request includes a classification of radio frequency (RF) signals from a macro base station connected to a core network, (ii) a processor, and (iii) a data storage device comprising computer-readable program logic. The computer-readable program logic is executable to determine whether the classification of the RF signals from the macro base station is associated with dropping or accepting the registration request, drop the registration request if the classification of the RF signals is associated with dropping the registration request, and accept the registration request if the classification of the RF signals is associated with accepting the registration request. In accordance with at least some embodiments, the computer-readable program logic can be executable to determine an activity level of the femto base station. In accordance with those embodiments, dropping the registration request can be conditioned on the activity level of the femto base station being less than an activity level threshold and accepting the registration request can be conditioned on the registration request being greater than the activity level threshold.

In yet another respect, an example embodiment can take the form of a method comprising: (i) detecting, by a processor of a femto base station, a reason to transmit a registration request to a core network device connected to a core network, (ii) scanning, by the femto base station, radio frequency (RF) signals from a macro base station connected to the core network, and (iii) transmitting, by the femto base station, the registration request to the core network device, wherein the registration request includes a classification of the RF signals from the macro base station. In accordance with at least some embodiments, the processor can determine an activity level of the femto base station. In accordance with those embodiments, the registration request can include data indicating the determined activity level of the femto base station.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

This description describes several example embodiments and several figures accompanying the description. Within the description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions or operations) can be used instead. Each element or components of an element shown in the figures or described in this description, alone or in combination with one or more other elements or components of the one or more other elements, can be referred to as a system. Furthermore, various functions or operations described as being performed by one or more elements can be carried out by a processor executing computer-readable program instructions or by any combination of hardware, firmware, or software.

This description refers to connecting or connection of multiple elements. Any connecting or connection of the elements described herein can occur using one or more wireless connections, one or more wired connections, or some combination of one or more wireless connections and one or more wired connections. Each wireless connection can occur by way of at least one wireless air interface, such as a wireless air interface that carries radio frequency signals. Each wired connection can include at least one conductor, such as, but not limited to a copper wire conductor, a coaxial cable, or a fiber optic cable.

II. Example System Architecture

A. Example Communication System

Figure 1:
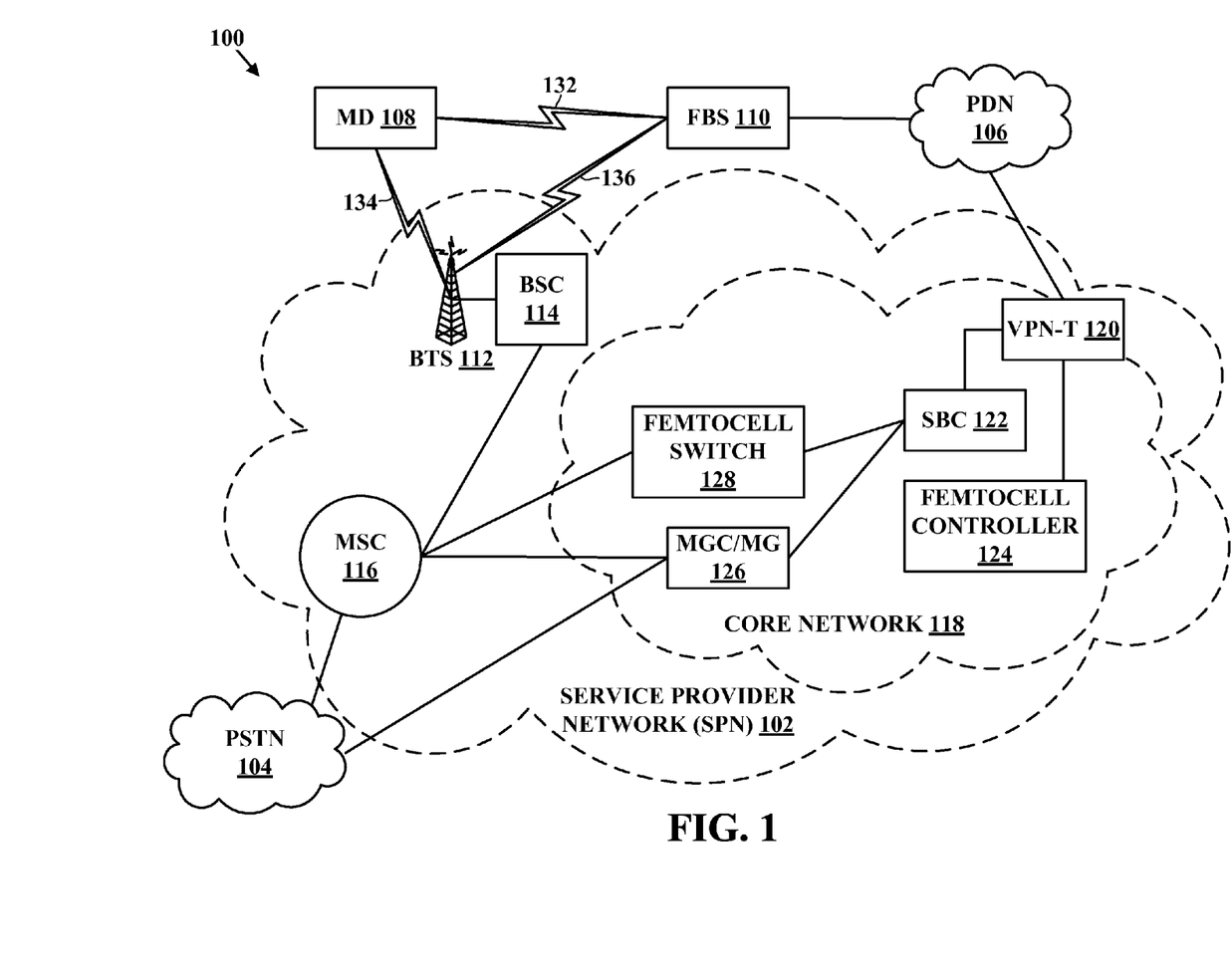
FIG. 1 is a simplified block diagram of an example communication system.

Referring now to the drawings, FIG. 1 is a simplified block diagram of an example communication system 100. At least a portion of communication system 100 is a wireless communication system. For purposes of explanation and example only, the wireless communication system shown in FIG. 1 is generally arranged and described according to CDMA system architecture. It should be understood, however, that an LTE system architecture could be used instead or in addition, as could an architecture according to one or more other protocols mentioned herein or any others now known or later developed.

Communication system 100 includes a service provider network (SPN) 102, a public switched telephone network (PSTN) 104, a packet-data network (PDN) 106, a mobile device (MD) 108, and a femtocell (or femto base station (FBS)) 110. MD 108 is a wireless communication device.

Service-provider network 102 can include some or all of the network elements depicted in FIG. 1 as being included in its dashed-cloud shape. In that regard, SPN 102 can include a macro base transceiver station (or more simply, "BTS" or a "macro base station") 112, a base station controller (BSC) 114, a mobile switching center (MSC) 116, and a core packet network (or more simply, "core network") 118. In general, there can be more or different communication links among the elements within SPN 102, and there can be more or different connections between SPN 102 and outside entities. There can also be one or more other packet-data networks or elements, one or more circuit-switched networks or elements, one or more signaling networks or elements, or one or more of any other suitable network(s) or element(s).

Core network 118 can include some or all of the network elements depicted in FIG. 1 as being included in its dashed-cloud shape. In that regard, core network 118 can include a VPN terminator (VPN-T) 120, a session border controller (SBC) 122, a femtocell controller 124, a media gateway controller/media gateway (MGC/MG) 126, and a femtocell switch 128. Other elements that can be included within core network 118 include, but are not limited to, a security gateway, a device management system, or a session initiation protocol (SIP) registrar device. One or more of the security device, the device management system, or the SIP registrar device can be integrated into another device within core network 118.

VPN terminator 120 can be arranged to establish secure VPN connections over PDN 106 with femtocells such as femtocell 110, enabling the femtocells to securely communicate with devices on SPN 102 and beyond. VPN-T 120 can include or operate as a security gateway for core network for core network 118.

SBC 122 can be arranged to perform call-control functions at or proximate to a border of SPN 102 or core network 118 so as to reduce loading on other elements of core network 118. SBC 122 can be arranged to control a flow of bearer traffic, such as media signals, signaling traffic, such as voice over internet protocol (VoIP) call signaling, or registration requests from FBS 110. SBC 122 can include or operate as a registrar, such as a SIP registrar. A registrar, such as a SIP registrar can accept registration requests, such as a SIP REGISTER message, and store the information contained in the registration requests for use by core network 118. SBC 122 can be referred to as an SBC/IMS, where IMS refers to an IP multimedia system or subsystem.

Femtocell controller 124 can be arranged to communicate via VPN terminator 120 with femtocells such as femtocell 110, perhaps to receive requests from various femtocells for configuration data, and to accordingly select various operational parameters for femtocells (e.g. carrier frequency, PN offset, whether to broadcast a pilot beacon, contents of any pilot beacon to be broadcast, transmission-power level), and to transmit those parameters to femtocells, perhaps along with other configuration data and messaging. Femtocell controller 124 can include or operate as a device management system.

Femtocell switch 128 can be arranged to act as a switch between MSC 116 and VPN terminator 120, enabling wireless communication devices, such as MD 108, communicating via femtocells to engage in calls over PSTN 104 via MSC 116.

PDN 106 can be the well-known global packet-data network generally referred to as the Internet, but could also be or include one or more other packet-data networks. PDN 106 can include one or more wide area networks, one or more local area networks, one or more public networks, one or more private networks, one or more wired networks, one or more wireless networks, or one or more networks of any other type. Devices in communication with PDN 106 can exchange data using a packet-switched protocol such as the Internet Protocol (IP), and can be identified by an address such as an IP address.

MGC/MG 126 can be arranged to (a) receive packet-based communications from entities on SPN 102, convert those to circuit-switched communications, and pass them to MSC 116 or PSTN 104 and (b) receive circuit-switched communications from MSC 116 or PSTN 104, convert those to packet-based communications, and pass them to other entities on SPN 102.

Communication system 100 can include other network elements as well, such as additional wireless communication devices, mobile or otherwise, in communication with BTS 112 and additional entities in communication with PSTN 104 or PDN 106, etc. Also, there could be one or more devices or networks making up at least part of one or more communication links that carry communications within or between communication network 100. For example, there could be one or more routers, cable modems, or other devices or networks on the link between femtocell 110 and PDN 106. Mobile device 108 is described more fully in connection with FIG. 2, while FBS 110 is described more fully in connection with FIG. 3. And certainly many other configurations of communication system 100 are possible, as the described configuration is provided by way of example and not limitation.

RF signals 132 can be communicated between MD 108 and FBS 110. RF signals 134 can be communicated between MD 108 and BTS 112. RF signals 136 can be communicated between BTS 112 and FBS 110. RF signals of RF signals 134 and 136 transmitted by BTS 112 can be referred to as forward-link RF signals. RF signals of RF signals 134 transmitted by MD 108 and RF signals of RF signals 136 transmitted by FBS 110 can be referred to as reverse-link RF signals.

B. Example Core Network Device

Figure 2:
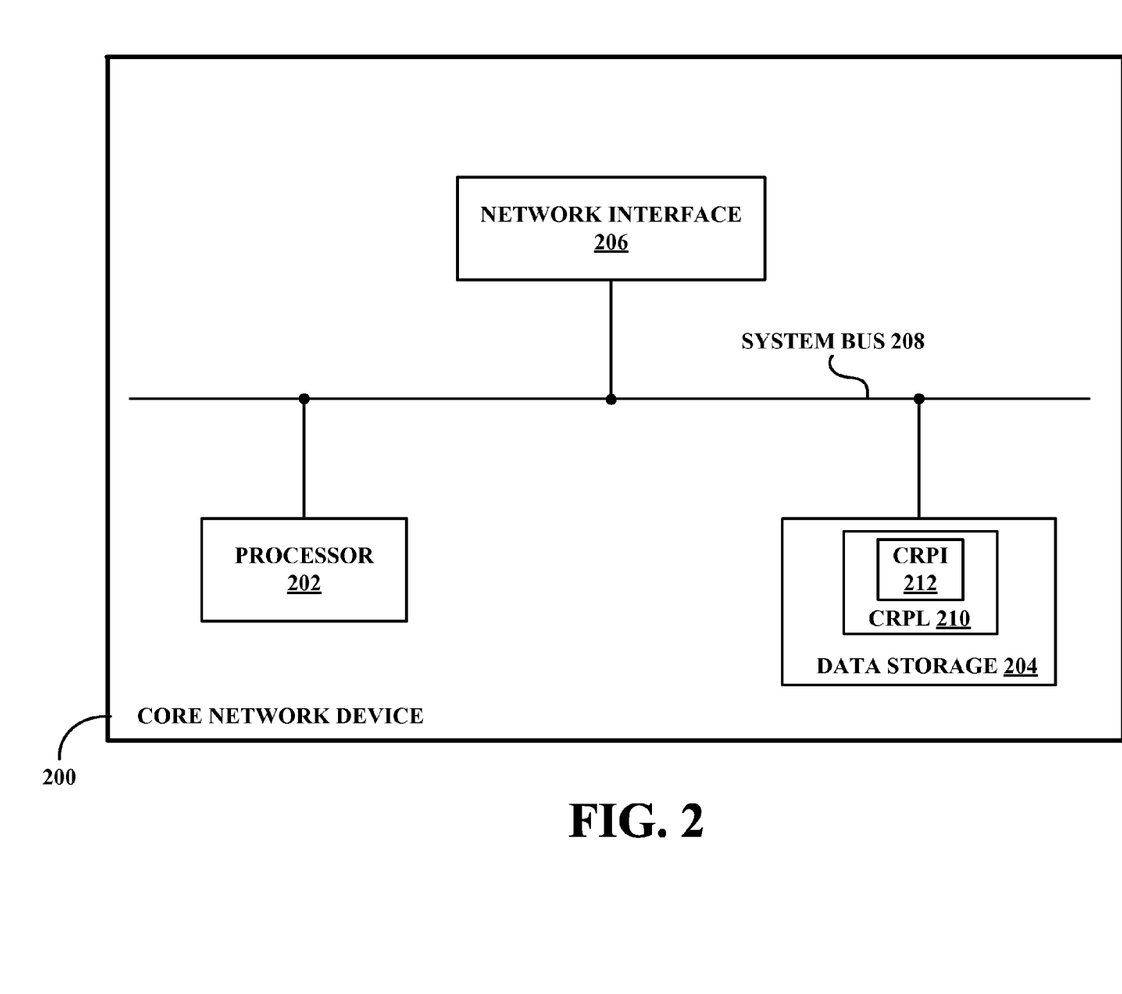
FIG. 2 is a simplified block diagram of an example core network device.

FIG. 2 is a simplified block diagram of a core network device 200 that includes a processor 202, a data storage device 204, and a network interface 206, all of which can be coupled together by a system bus, network, or other communication mechanism 208. In general, one or more devices within core network 118 can be configured like core network device 200. In particular, and by way of example, VPN-T 120, SBC 122, femtocell controller 124 or another device referred to herein as a core network device can be configured like core network device 200.

Processor 202, or any other processor described in this description or used within any example embodiment, can comprise one or more general-purpose processors (for example, INTEL single core microprocessors or INTEL multicore microprocessors) or one or more special-purpose processors (for example, application specific integrated circuits (ASICs) or digital signal processors (DSPs)). Processor 202 can execute computer-readable program logic, which can include computer-readable program instructions (CRPI) stored in data storage device 204.

Data storage device 204, or any other data storage device described in this description or used within any example embodiment, can comprise a non-transitory computer-readable storage medium readable by a processor. Additionally or alternatively, the data storage device can comprise logic blocks or logic gates to perform various operations, such as operations described in this description as being executed by a core network device. Any computer-readable storage medium described in this description or used within any example embodiment can comprise volatile or non-volatile storage components, such as optical, magnetic, organic or other memory or disc storage, which can be, but is not required to be, integrated in whole or in part with a processor.

Network interface 206 can comprise an interface (for example, one or more interfaces) to at least one other element of communication system 100. Network interface 206 can comprise a transmitter configured to transmit and a receiver configured to receive communications such as signaling and bearer communications to or from another element of communication system 100. The transmitter and receiver can be separate or a combined transmitter and receiver in the form of a transceiver. A transmitter and receiver of network interface 206 that transmits RF signals can be referred to as a radio transmitter and radio receiver, respectively. The transmitter and receiver can transmit data to a wired network and receive data from the wired network.

Data storage device 204 can comprise computer-readable program logic (CRPL) 210 executable by core network device 200. A person having ordinary skill in the art will understand that execution of program instructions of CRPL 210 can include executing some, but not all, of CRPL 210. CRPL 210 can comprise computer-readable program instructions (CRPI) 212 executable by processor 202. Any portion of CRPL 210 can be program instructions of CRPI 212. In general, CRPL 210 can comprise program logic executable to perform any function described in the description or shown in the figures as being performed at least in part by a device in core network 118.

Data storage device 204 can store various data that processor 202 can access (for example, read from data storage device 204) to use in performing one or more operations described herein. For example, data storage device 204 can store the data shown in Table 1, which can represent example classifications (for example, good, average, poor, and poor/absent) of the coverage and capacity provided by macro RF signals received at FBS 110, and an example response (for example, drop or accept registration request) for each combination of classifications of the macro RF coverage and capacity.

TABLE 1

| Macro RF Coverage | Macro RF Capacity | Response to Registration Request |
| --- | --- | --- |
| Good | Good | Dropped |
| Good | Average | Dropped |
| Good | Poor | Accepted |
| Average | Good | Dropped |
| Average | Average | Dropped |
| Average | Poor | Accepted |
| Poor/Absent | Good | Accepted |
| Poor/Absent | Average | Accepted |
| Poor/Absent | Poor | Accepted |

CRPL 210 can comprise program logic executable to receive a registration request from FBS 110. The registration request can include a classification of RF signals from a macro base station connected to a core network, such as RF signals 136 transmitted by BTS 112. Network interface 206 can receive the registration request and provide the received registration request to processor 202 by system bus 208.

CRPL 210 can comprise program logic executable to determine whether a classification of RF signals from a macro base station is associated with dropping or accepting a registration request. Execution of that program logic can include comparing the classification information within the registration request to the data shown in Table 1.

CRPL 210 can comprise program logic executable to determine an activity level of FBS 110 from activity level information included within the registration request or otherwise transmitted to core network device 200 from FBS 110. The activity level can indicate the last time activity from FBS 110 occurred. The activity from FBS 110 can be the last time a wireless communication device carried out a voice call or other type of communication using FBS 110.

CRPL 210 can comprise program logic executable to determine the activity level of FBS 110 or another FBS using data stored within core network 118 regarding the activity level of FBS 110 or the other FBS. Determining the activity level of FBS 110 can include core network 118 or a device therein determining whether FBS 110 processed any voice calls within a predetermined amount of time occurring prior to core network 118 or the device therein receiving the registration request from FBS 110.

CRPL 210 can comprise program logic executable to compare data indicating the last time a voice call or other activity occurred using FBS 110 to a current time so as to determine a time difference, and to compare the time difference to a time threshold. The result of that comparison can be used alone or in combination with the classification of RF signals received from the macro base station 112 to determine whether to accept or drop the registration request.

CRPL 210 can comprise program logic executable to drop a registration request if the classification of RF signals is associated with dropping the registration request.

CRPL 210 can comprise program logic executable to accept a registration if the classification of the RF signals is associated with accepting the registration request.

CRPL 210 can comprise program logic executable to cause a response to the registration request to be transmitted to a source of the registration request (for example, FBS 110). The response to registration request can notify the source of the registration request whether the registration request is accepted or dropped. For cases in which the registration request was dropped, a response to the registration request can include data indicating when FBS 110 should retry registering with SPN 102 or core network 118. As an example, data indicating when FBS 110 should retry registering can include data that indicates a particular time, such as a particular coordinated universal time (UTC), a particular date and time, or an amount of time, such as ten minutes.

CRPL 210 can comprise program logic executable to cause core network device 200 to transmit updated data indicating when FBS 110 should retry registering with SPN 102 or core network 118. The updated data can indicate FBS 110 should retry registering sooner or later than indicated by the data previously sent to indicate when the registration retry should occur. This CRPL 210 executable to transmit the updated data can, for example, be executed in response to core network device 200 determining a capacity for core network device 200 to handle more registration requests has increased or decreased by more than a threshold amount.

C. Example Femtocell

Figure 3:
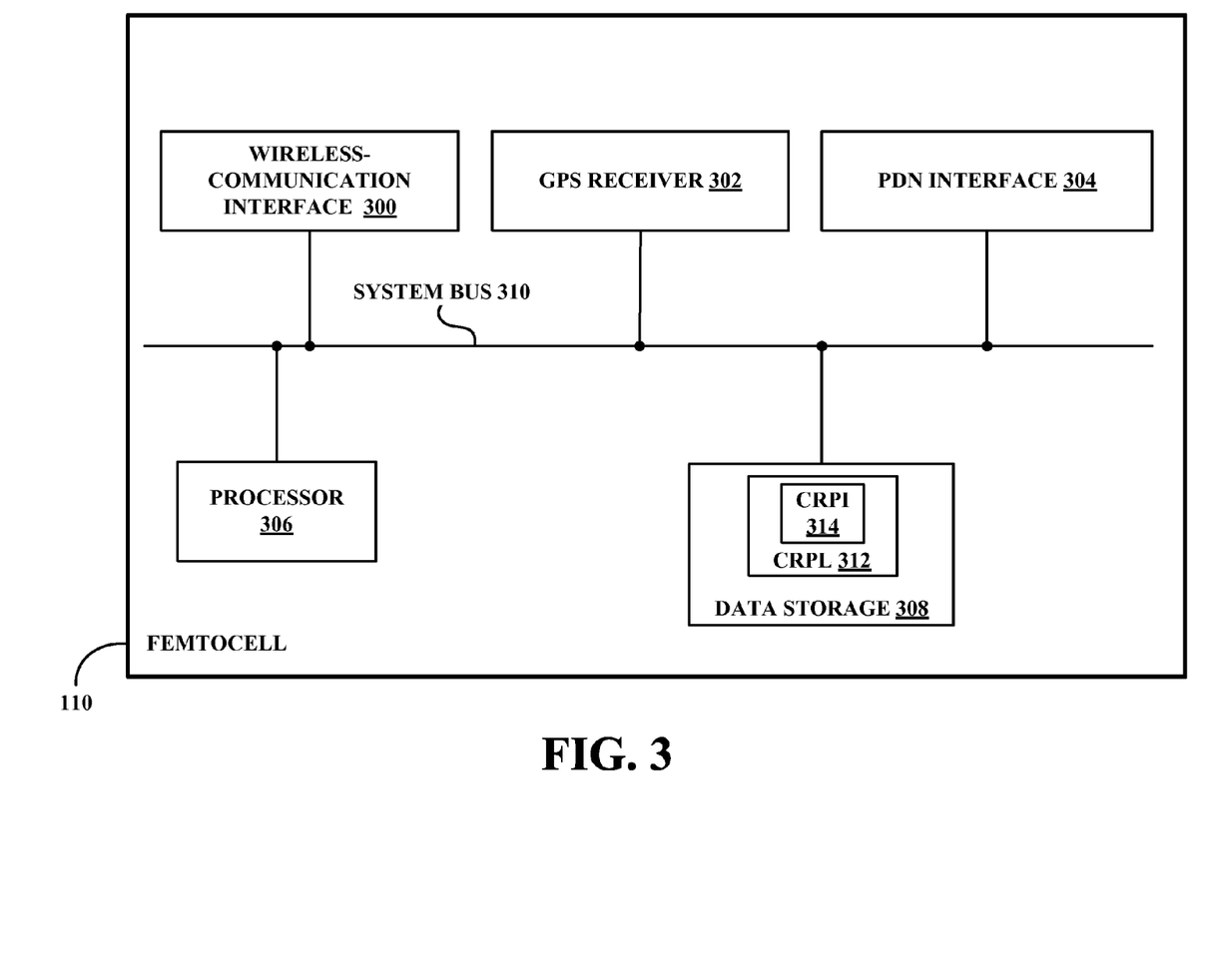
FIG. 3 is a simplified block diagram of an example femtocell.

FIG. 3 is a simplified block diagram of femtocell (or femto base station (FBS)) 110, which includes a wireless-communication interface 300, a global positioning system (GPS) receiver 302, a PDN interface 304, a processor 306, and a data storage device 308, all of which can be coupled together by a system bus, network, or other communication mechanism 310. Note that femtocell 110 can have additional or different components, and that this structure is provided by way of example.

Wireless-communication interface 300 can include one or more antennas, one or more chipsets, a set of one or more channel elements, and/or one or more other components suitable for providing a wireless coverage according to a wireless-communication protocol such as CDMA or LTE (or one or more other technologies or protocols). GPS receiver 302 can be any known or hereafter-developed GPS receiver, suitable for receiving and decoding GPS signals for location and timing purposes, perhaps among other purposes. In some embodiments, a femtocell can have a location module in addition to or instead of a GPS receiver.

PDN interface 304 can provide a (e.g., wired) packet-data interface for communicating with a device such as a router or cable modem, and in general for communicating over one or more packet-data networks such as PDN 106.

Processor 306 can comprise one or more general-purpose processors (for example, INTEL single core microprocessors or INTEL multicore microprocessors) or one or more special-purpose processors (for example, application specific integrated circuits (ASICs) or digital signal processors (DSPs)). Processor 306 can execute computer-readable program logic, which can include computer-readable program instructions (CRPI) stored in data storage device 308.

Data storage device 308 can comprise a non-transitory computer-readable storage medium readable by processor 306. Additionally or alternatively, data storage device 308 can comprise logic blocks or logic gates to perform various operations, such as operations described in this description as being executed by femtocell 110. Data storage device 308 can comprise CRPL 312 executable by femtocell 110. A person having ordinary skill in the art will understand that execution of program instructions of CRPL 312 can include executing some, but not all, of CRPL 312. CRPL 312 can comprise CRPI 314 executable by processor 306. Any portion of CRPL 312 can be program instructions of CRPI 314. Executing CRPL 312 or CRPI 314 can include carrying out the femtocell functions described in this description, as well as any other operational, configuration, and/or other type of data deemed suitable in a given femtocell implementation.

CRPL 312 can comprise program logic executable to detect a reason to transmit a registration request and to cause wireless communication interface 300 or PDN interface 304 to transmit the registration request to a core network device within core network 118. Examples of reasons to transmit the registration request are described elsewhere herein.

CRPL 312 can comprise program logic executable to determine the activity level of FBS 110, such as the last time a wireless communication device carried out a voice call or other type of communication using FBS 110. CRPL 312 can comprise program logic executable to determine whether FBS 110 processed any voice calls within a predetermined amount of time prior to FBS 110 detecting the reason to transmit the registration request or prior to a time when FBS 110 is embedding the registration request with the activity level information. Data storage device 308 can store time data for determining the activity level, such as time data indicating when the most recent communication performed using FBS 110 started or ended.

CRPL 312 can comprise program logic executable to embed (e.g., place within) the registration request with activity level information and the classification data pertain to RF signals FBS 110 receives from macro base station 112.

D. Example Mobile Device

Figure 4:
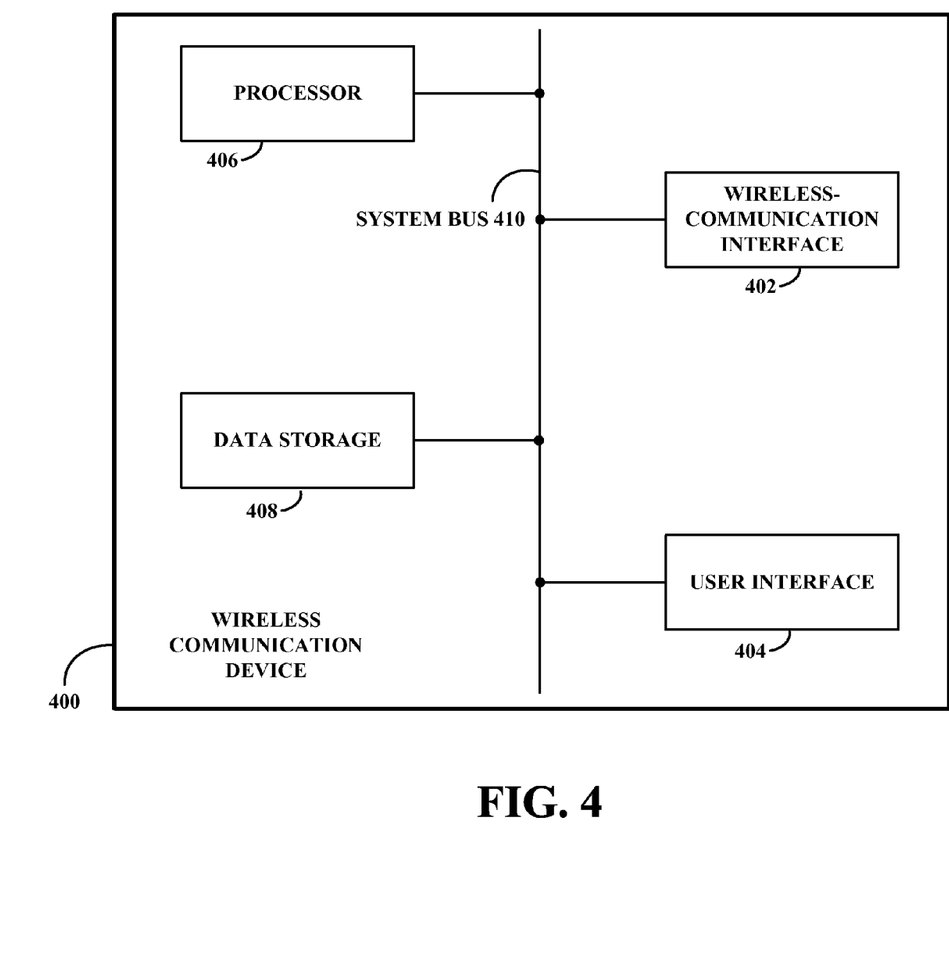
FIG. 4 is a simplified block diagram of an example wireless communication device.

FIG. 4 depicts wireless communication device 400 as including a wireless-communication interface 402, a user interface 404, a processor 406, and a data storage device 408, all of which can be coupled together by a system bus, network, or other communication mechanism 410. Mobile device 108 shown in FIG. 1 can be configured like wireless communication device 400. Wireless communication device 400 can be a mobile wireless communication device or otherwise. Wireless communication device 400 can comprise or be configured as a cellular phone, a laptop computer, a tablet device, or some other device.

Wireless-communication interface 402 can comprise one or more antennae and one or more chipsets for communicating with one or more base stations over respective air interfaces. As an example, one such chipset could be suited for LTE communication. As another example, one such chipset could be suited for CDMA communication. Wireless-communication interface 402 can also or instead be arranged to communicate according to one or more other types of wireless communication (e.g., protocols) mentioned herein and/or any others now known or later developed. User interface 404 can include one or more input devices such as a touchscreen, one or more buttons, a microphone, and the like for receiving inputs from users, as well as one or more output devices such as a display, one or more indicator lights, a speaker, and the like for communicating outputs to users.

Processor 406 can comprise one or more general-purpose processors and/or one or more special-purpose processors, and can be integrated in whole or in part with wireless-communication interface 402. Data storage device 408 can comprise one or more volatile and/or non-volatile storage components (such as magnetic, optical, flash, or other non-transitory storage), and can be integrated in whole or in part with processor 406. And certainly other configurations are possible. Data storage device 408 can contain CRPL or CRPI executable by wireless communication device 400 or processor 406 for carrying out various mobile-device functions described herein.

III. Example Operation

Figure 5:
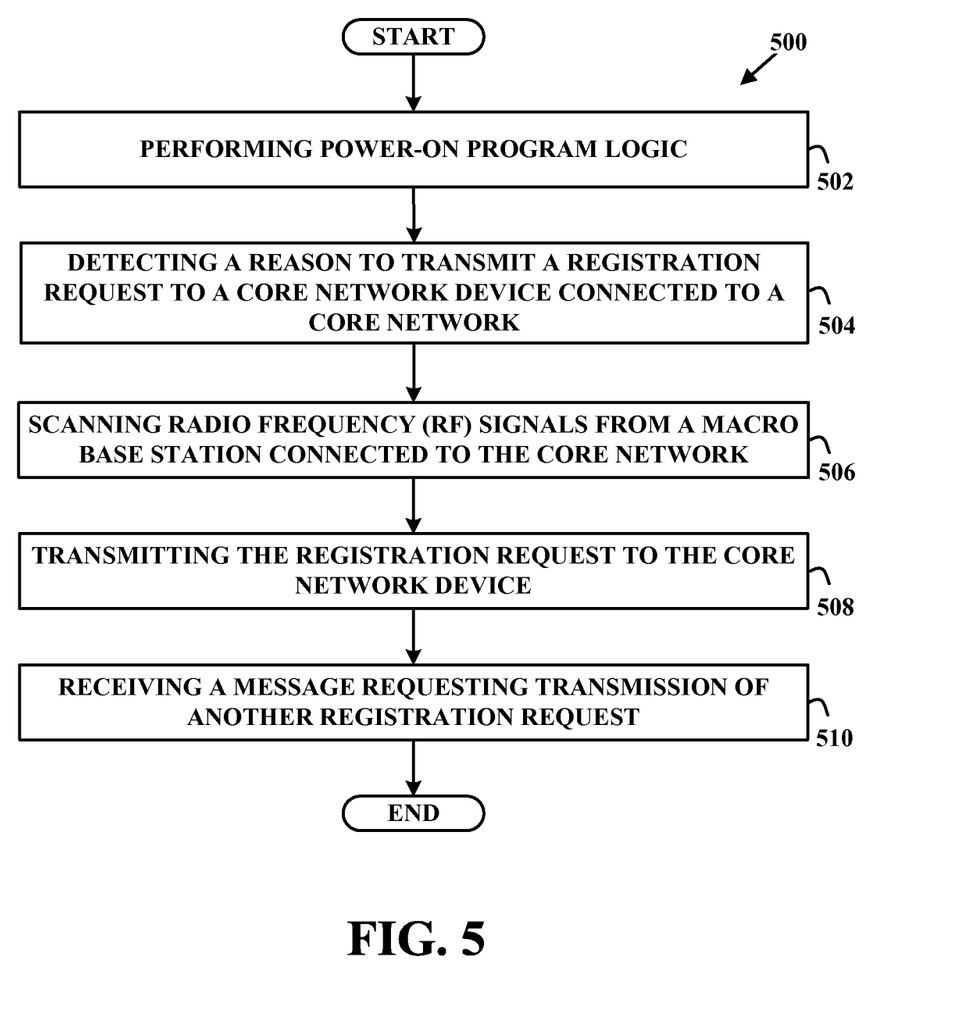
FIG. 5 is a flowchart depicting a set of functions that can be carried out in accordance with one or more example embodiments described herein.

FIG. 5 depicts a flowchart showing a set of functions (for example, operations) 500 (or more simply, "the set 500") that can be carried out in accordance with any or one or more of the example embodiments described herein. The functions of the set 500 are shown within blocks labeled with even integers between 502 and 510, inclusive. Other functions described herein can be performed prior to, while, or after performing any one or more of the functions of the set 500. Those other functions can be performed in combination with or separately from any one or more of the functions of the set 500.

Block 502 includes performing power-on program logic. Femtocell 110 or processor 306 can perform the power-on program logic. The power-on program logic can be located within or as part of CRPL 312 or CRPI 314. As an example, performing the power-on program logic can occur in response to electrical power being provided to femtocell 110 for an initial time or for an initial time after femtocell being installed at a new location. As another example, performing the power-on program logic can occur in response to electrical power being provided to femtocell 110 after electrical power was not provided for at least an amount of time during which femtocell 110 powered down to an off state. As yet another example, performing the power-on program logic can occur in response a femtocell 110 performing program logic that resets processor 306. Other examples of events that trigger performance of the power-on program logic are also possible.

Next, block 504 includes detecting a reason to transmit a registration request to a core network device connected to a core network. Femtocell 110 or processor 306 can detect the reason to transmit the registration request. The core network device can be arranged like core network device 200. The core network can be arranged like core network 118.

As an example, detecting the reason to transmit the registration request can comprise femtocell 110 or processor 306 detecting execution of the power-on program logic is being performed by femtocell 110 or processor 306. Detecting the power-on program logic is being performed can include, but is not limited to, detecting initiation of executing the power-on program logic or completing execution of the power-on program logic.

As another example, detecting the reason to transmit the registration request can comprise femtocell 110 or processor 306 detecting receipt of a message requesting femtocell 110 to send another registration request after a particular amount of time, and detecting that the amount of time has passed since receipt of the message or since a time the message was transmitted to femtocell 110.

As yet another example, detecting the reason to transmit the registration request can comprise femtocell 110 or processor 306 detecting receipt of a message requesting femtocell 110 to send another registration request at or after a particular time or date and time, and detecting that the particular time or date and time is or has occurred.

Next, block 506 includes scanning radio frequency (RF) signals from a macro base station connected to the core network. Scanning the RF signals from macro base station 112 can include wireless communication interface 300 receiving the RF signals, measuring the received RF signals, and comparing the measured RF signals to RF signal thresholds. As an example, measuring the received RF signal can include measuring a signal to noise ratio of the received RF signal. The RF signal thresholds can include multiple thresholds so that FBS 110 can determine whether the RF coverage provided by macro base station 112 is classified as good (for example, the measured RF signal is above the greatest RF signal threshold), average (for example, the measured RF signal is less than the greatest RF signal threshold but greater than the least RF signal threshold, and poor/absent (for example, the measured RF signal is less than the least RF signal threshold.

Next, block 508 includes transmitting the registration request to the core network device. The registration request can include a classification of the RF signals from the macro base station. FBS 110, wireless communication interface 300 or PDN interface 304 can transmit the registration request. Transmitting the registration request can include transmitting the registration request over PDN 106. The registration request can be configured as a session initiation protocol (SIP) REGISTER message. The SIP REGISTER message can comprise an extensible markup language (XML) body including the classification of the RF signals from macro base station 112.

The classification of the RF signals from macro base station 112 can comprise a classification of a coverage provided by the RF signals from macro base station 112. That classification can, for example, indicate good, average, or poor/absent. Additionally or alternatively, the classification of the RF signals from macro base station 112 can comprise a classification of a capacity of the RF signals from macro base station 112. This latter classification can, for example, indicate good, average, or poor. Other examples of what the various classifications are called are possible. Furthermore, more or fewer classifications of RF coverage or RF capacity can be defined.

Next, block 510 includes receiving a message requesting transmission of another registration request. FBS 110 can receive the message in response to transmitting a registration request that is dropped by core network 118 or a device therein. FBS 110 can transmit another registration request. Transmitting the other registration request can be conditioned on any of a variety of conditions, such as time conditions indicated in the message requesting retransmission of the other registration request.

Figure 6:
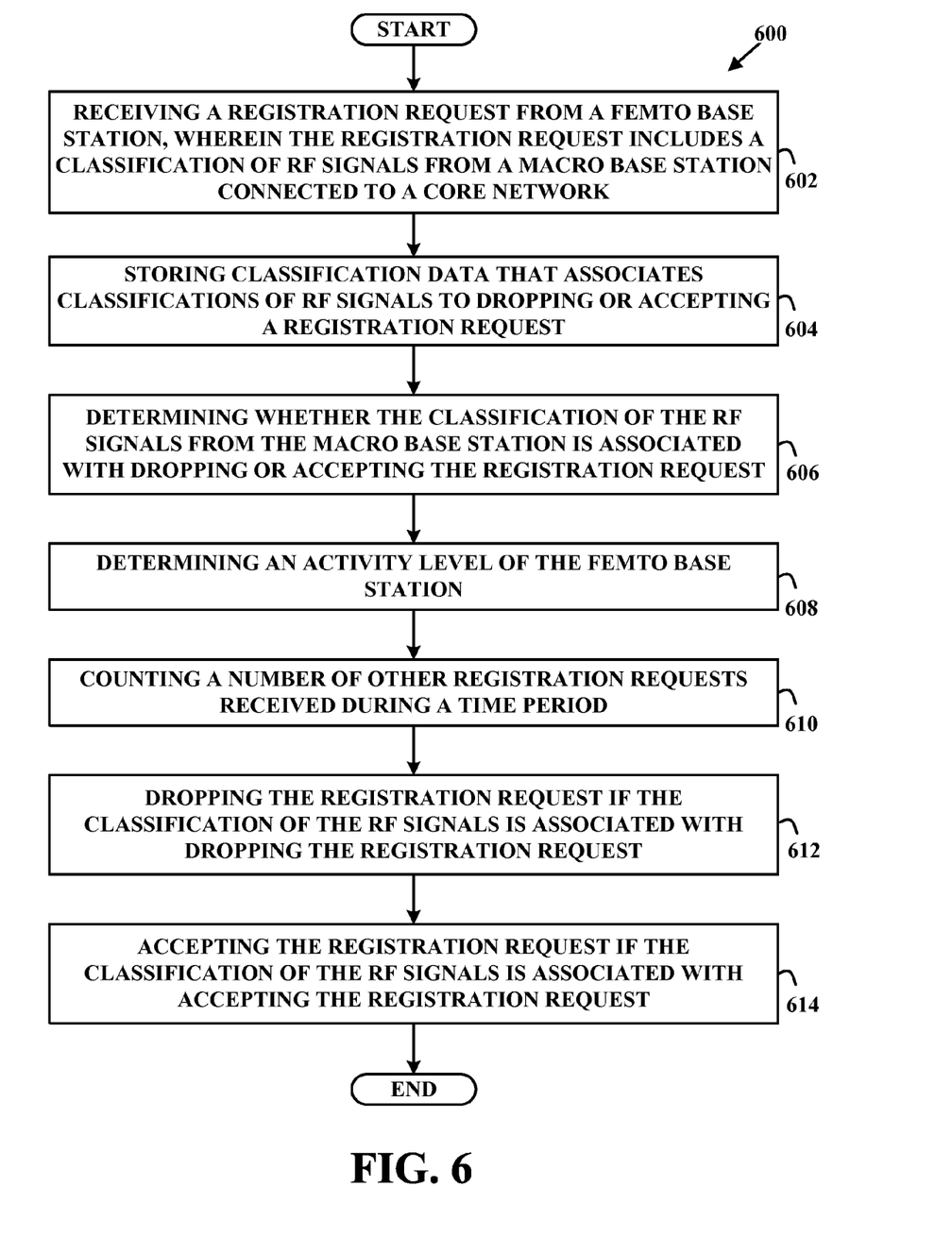
FIG. 6 is a flowchart depicting another set of functions that can be carried out in accordance with one or more example embodiments described herein.

Next, FIG. 6 depicts a flowchart showing a set of functions (for example, operations) 600 (or more simply, "the set 600") that can be carried out in accordance with any or one or more of the example embodiments described herein. The functions of the set 600 are shown within blocks labeled with even integers between 602 and 614, inclusive. Other functions described herein can be performed prior to, while, or after performing any one or more of the functions of the set 600. Those other functions can be performed in combination with or separately from any one or more of the functions of the set 600.

Block 602 includes receiving a registration request from a femto base station. The registration request can include a classification of RF signals from macro base station 112 connected to core network 118. Core network 118 or a device therein can receive the registration request. The registration request can include a classification of RF signals from macro base station 112 that is connected to core network 118.

The classification of the RF signals from the macro base station can comprise a classification of a coverage provided by the RF signals from macro base station 112 or a classification of a capacity of the RF signals from the macro base station 112. The classification of RF signals can be referred to as classification data. The classification data can comprise a macro RF coverage indication of good, average, or poor/absent, or some other indication of macro RF coverage. The classification data can comprise a macro RF capacity indication of good, average or poor, or some other indication of macro RF capacity.

In general, the registration request can be configured as any message a device sends to a core network for registering the device with the core network. That registration message can include the activity level information or classification data regarding the RF signals received by FBS 110. As an example, the registration request can be configured as a session initiation protocol (SIP) REGISTER message. The SIP REGISTER message can comprise an extensible markup language (XML) body including the classification of the RF signals from macro base station 112. Other examples of the registration message include an attach message, such as an LTE attach message, an H.323 registration message, or a SIP MESSAGE message. Those example messages can include the activity level information or classification data.

Next, block 604 includes storing classification data that associates classifications of RF signals to dropping or accepting a registration request. Core network 118 or a device therein can store the classification data that associates classifications of RF signals to dropping or accepting a registration request. The stored data can be arranged like the data in Table 1 or in another manner. Storing of the classification data can occur prior to receiving the registration request at block 602.

Next, block 606 includes determining whether the classification of the RF signals from the macro base station 112 is associated with dropping or accepting the registration request. Making that determination can include core network 118 or a device therein comparing classification data with the registration request to classification comparison data, such as the classification comparison data shown in Table 1. Furthermore, making that determination may be conditioned on the result of comparing an activity level of the FBS 110 to an activity level threshold.

In accordance with any or one or more example embodiments, determining whether the classification of the RF signals from the macro base station 112 is associated with dropping or accepting the registration request is conditioned on core network 118 or a device therein receiving a number of other registration requests from other femto base stations during a time period occurring before core network 118 or the device therein receiving the registration request from FBS 110. In accordance with that or those example embodiments, the number of other registration requests exceeds a threshold number of registration requests. Data indicating the threshold number of registration requests and the time period occurring before receipt of the registration request can be stored with data storage device 204.

In accordance with any or one or more example embodiments, determining whether the classification of the RF signals from the macro base station 112 is associated with dropping or accepting the registration request is conditioned on core network 118 or a device therein operating in a state that exceeds a threshold congestion state. Data indicating the threshold congestion state for comparison to operating conditions of core network 118 or the device therein can be stored with data storage device 204. The threshold congestion state can be for operating conditions of core network device 118 or the device therein other than receiving more than a threshold number of registration requests from femto base stations.

Next, block 608 includes determining an activity level of the femto base station. FBS 110, or core network 118 or a device therein, can determine the activity level of FBS 110. The activity level can indicate the last time activity from FBS 110 occurred. The activity from FBS 110 can be the last time a wireless communication device carried out a voice call or other type of communication using FBS 110. Additionally or alternatively, determining the activity level of FBS 110 can include core network 118 or a device therein determining whether FBS 110 processed any voice calls within a predetermined amount of time occurring prior to core network 118 or the device therein receiving the registration request from FBS 110.

The last time of the voice call or other activity can be compared to a current time to determine a time difference. The time difference can be compared to a time threshold, such as 60 minutes. The result of that comparison can be used alone or in combination with the classification of RF signals received from the macro base station 112 to determine whether to accept or drop the registration request. For example, if the time difference exceeds the time threshold, the activity level is less than the activity level threshold and the core network device can drop the registration request sent by FBS 110 without even considering the classification data. On the other hand, accepting the registration request at the core network device can be conditioned on the activity level being greater than the activity level threshold. The activity level can be considered to be greater than the activity level threshold if the time difference does not exceed the time threshold.

Next, block 610 includes counting a number of other registration requests received during a time period. The time period for counting registration requests can be thirty seconds, sixty seconds, or some other amount of time. Core network 118 or a device therein can count the number of other registration requests and can exclude any registration requests received by core network 118 prior to a start of the time period. The registration requests counted for block 610 can include registration requests from femto base stations connected to core network 118. The counted registration requests can be used to determine whether more than a threshold number of registration requests have recently been received. If the counted registration requests exceed the threshold, the core network 118 can responsively execute CRPL or CRPI that causes core network 118 to operate in a state in which core network 118 makes determinations whether to drop registration requests from femto base stations.

Next, block 612 includes dropping the registration request if the classification of the RF signals is associated with dropping the registration request. Dropping the registration request can include core network 118 or a device therein transmitting to FBS 110 a registration request response indicating the registration request was dropped. The registration request response can include time data indicating a time, or a date and time, when FBS 110 should transmit another registration request to core network 118. The registration request response can include time data indicating an amount of time FBS 110 should wait before transmitting another registration request to core network 118. Core network 118 or a device therein can determine the time data based on the number of other registration requests received during the time period during which registration requests were counted. In at least some cases, the time data represents a time at which core network 118 determines another registration request from FBS 110 would be accepted rather than dropped.

Next, block 614 includes accepting the registration request if the classification of the RF signals is associated with accepting the registration request. A core network device of core network 118 can accept the registration request. In response to accepting the registration request, core network 118 or a device therein can register FBS 110 so as to allow FBS 110 to process communication sessions requests and communication sessions for wireless communication devices in proximity to FBS 110. Various messages can be communicated between FBS 110 and core network 118 using PDN 106 to register FBS 110 with core network 118.

IV. Conclusion

Example embodiments have been described above. Those skilled in the art will understand that changes and modifications can be made to the described embodiments without departing from the true scope and spirit of the present invention, which is defined by the claims.

We claim:
1. A femto base station comprising:
a processor;
a wireless communication interface; and
a non-transitory computer-readable data storage device storing computer-readable program logic,
wherein execution of the computer-readable program logic by the processor causes the femto base station to perform a set of actions, the actions comprising:
   detecting a reason to transmit a registration request to a core network device connected to a core network;
   scanning radio frequency (RF) signals from a macro base station connected to the core network; and
   transmitting the registration request to the core network device,
wherein the registration request includes a classification of the RF signals from the macro base station.

2. The femto base station of claim 1,
wherein the computer-readable program logic comprises power-on program logic, and
wherein detecting the reason to transmit the registration request comprises detecting the femto base station is performing the power-on program logic.

3. The femto base station of claim 2,
wherein detecting the femto base station is performing the power-on program logic includes at least one of detecting initiation of executing the power-on program logic and completing execution of the power-on program logic.

4. The femto base station of claim 1, further comprising:
a packet-data network interface configured for connection of the femto base station to a packet-data network.

5. The femto base station of claim 4, wherein the packet-data network provides a wired packet-data interface of the femto base station to a router or a cable modem.

6. The femto base station of claim 1, wherein the actions further comprise:
receiving, by the femto base station from the core network device, a message requesting the femto base station to send another registration request after a particular amount of time, and
wherein detecting the reason to transmit the registration request comprises determining, by the processor, the particular amount of time has passed since receiving the message.

7. The femto base station of claim 1, wherein the classification of the RF signals from the macro base station comprises a classification of a coverage provided by the RF signals from the macro base station.

8. The femto base station of claim 1, wherein the classification of the RF signals from the macro base station comprises a classification of a capacity of the RF signals from the macro base station.

9. The femto base station of claim 1,
wherein the registration request is configured as a session initiation protocol (SIP) REGISTER message having an XML body including the classification of the RF signals from the macro base station, and
wherein the classification of the RF signals from the macro base station comprises at least one of a classification of a coverage provided by the RF signals from the macro base station and a classification of a capacity of the RF signals from the macro base station.

10. The femto base station of claim 1, wherein the classification of the RF signals from the macro base station indicates one of (i) good RF coverage and good RF capacity, (ii) good RF coverage and average RF capacity, (iii) average RF coverage and good RF capacity, (iv) average RF coverage and average RF capacity, (v) good RF coverage and poor RF capacity, (vi) average RF coverage and poor RF capacity, (vii) poor RF coverage and good RF capacity, (viii) poor RF coverage and average RF capacity, and (ix) poor RF coverage and poor RF capacity.

11. The femto base station of claim 10,
wherein an indication of one of (i) good RF coverage and good RF capacity, (ii) good RF coverage and average RF capacity, (iii) average RF coverage and good RF capacity, and (iv) average RF coverage and average RF capacity provides an indication to drop the registration request, and
wherein an indication of one of (i) good RF coverage and poor RF capacity, (ii) average RF coverage and poor RF capacity, (iii) poor RF coverage and good RF capacity, (iv) poor RF coverage and average RF capacity, and (v)

poor RF coverage and poor RF capacity provides an indication to accept the registration request.

12. The femto base station of claim 1,
wherein the set of actions further comprises detecting an activity level of the femto base station, and
wherein the data storage device stores time data for determining the activity level.

13. The femto base station of claim 12,
wherein the activity level of the femto base station indicates a most-recent time a wireless communication device carried out a communication using the femto base station, and
wherein the time data indicates when the communication using the femto base station started or ended.

14. The femto base station of claim 13, wherein the communication using the femto base station includes a voice call.

15. The femto base station of claim 1, wherein the core network device comprises at least one of a security gateway, a device management system, a session initiation protocol (SIP) registrar, and a session border controller.

16. The femto base station of claim 1, wherein scanning the RF signals from the macro base station connected to the core network includes at least one of (i) receiving, by the wireless communication interface, the RF signals, (ii) measuring the received RF signals, and (iii) comparing the measured RF signals to RF signal thresholds.

17. A non-transitory computer-readable medium storing program logic, that when executed by a computing device, cause a set of actions to be performed, the set of actions comprising:
  detecting a reason to transmit a registration request to a core network device connected to a core network;
  scanning radio frequency (RF) signals from a macro base station connected to the core network; and
  transmitting the registration request to the core network device,
  wherein the registration request includes a classification of the RF signals from the macro base station.

18. The non-transitory computer-readable medium of claim 17,
wherein the computer-readable program logic comprises power-on program logic, and
wherein detecting the reason to transmit the registration request comprises detecting the femto base station is performing the power-on program logic.

19. The non-transitory computer-readable medium of claim 17,
wherein the set of actions further comprise receiving, by the femto base station from the core network device, a message requesting the femto base station to send another registration request after a particular amount of time, and
wherein detecting the reason to transmit the registration request comprises determining, by the processor, the particular amount of time has passed since receiving the message.

20. The non-transitory computer-readable medium of claim 17, wherein the classification of the RF signals from the macro base station comprises at least one of a classification of a coverage provided by the RF signals from the macro base station and a classification of a capacity of the RF signals from the macro base station.

* * * * *